United States Patent [19]

Schlenk

[11] Patent Number: 5,309,343
[45] Date of Patent: * May 3, 1994

[54] DRIVER CIRCUIT HAVING PARALLELED TRANSISTORS AND CURRENT-VARIABLE RESISTIVE ELEMENTS

[76] Inventor: Robert B. Schlenk, 3502 Dell Rd., Louisville, Ky. 40299

[*] Notice: The portion of the term of this patent subsequent to Dec. 10, 2008 has been disclaimed.

[21] Appl. No.: 988,719

[22] Filed: Dec. 10, 1992

[51] Int. Cl.$^5$ .......................................... H02M 3/335
[52] U.S. Cl. .......................................... 363/16; 363/18; 363/71; 363/131; 331/107 R
[58] Field of Search ............... 363/16, 131, 18, 71; 331/107 R

[56] References Cited

U.S. PATENT DOCUMENTS

| | | | |
|---|---|---|---|
| 4,731,721 | 3/1988 | Igashira et al. | 363/131 |
| 4,812,960 | 3/1989 | Sakamoto et al. | 363/131 |
| 5,072,159 | 12/1991 | Schlenk | 315/278 |
| 5,073,849 | 12/1991 | Morris | 363/131 |

OTHER PUBLICATIONS

Brown, Marty, *Practical Switching Power Supply Design*, 1990, Academic Press, Inc., pp. 186–189.

Primary Examiner—Steven L. Stephan
Assistant Examiner—Y. Jessica Han
Attorney, Agent, or Firm—Camoriano & Smith

[57] ABSTRACT

The present invention is a driving circuit that comprises a magnetically permeable core, a high voltage secondary winding around the core with the secondary winding being connectable to a device to be powered, a circuit connectable to a D.C. power source and being magnetically coupled to the secondary winding to induce a voltage thereacross sufficient to power a device, a plurality of connected windings wound around the core, a RC network and a plurality of parallel connected transistors coupled to the windings and the RC network with each respective transistor having a base terminal connected to the RC network by a respective current-variable resistive element, and a first primary winding connected in series with a plurality of second primary windings, and each primary winding connected in parallel with a respective capacitor.

5 Claims, 1 Drawing Sheet

DRIVER CIRCUIT HAVING PARALLELED TRANSISTORS AND CURRENT-VARIABLE RESISTIVE ELEMENTS

FIELD OF THE INVENTION

The invention relates to an improved driver circuit for powering various devices such as gas discharge lamps and, more particularly, relates an improved driver circuit having a plurality of parallel connected transistors, each connected to a current-variable resistive element in series with its base. This invention is further related to and is a significant improvement to U.S. Pat. No. 5,072,159.

BACKGROUND OF THE INVENTION

U.S. Pat. No. 5,072,159 issued Dec. 10, 1991 having the same inventor as the present invention is incorporated herein by way of reference for a discussion of the prior art leading up to the disclosure set forth in U.S. Pat. No. 5,072,159. The circuit of U.S. Pat. No. 5,072,159 has proven to be applicable in the driving of many components that require a stable circuit, quiet operation and minimal heating without general objectionable levels of radio frequency interference. There is, however, always a need for an improved circuit that supplies a superior wave form and has better switching characteristics. It is therefore a paramount object of the present invention to provide an improved driver circuit driven by a plurality of parallel transistors whereby various and different types of devices may be more effectively, efficiently and economically driven.

The object above and other objects of the present invention will become readily apparent upon further review of the following specification and drawings.

SUMMARY OF THE INVENTION

The improved driving circuit of the present invention includes a magnetically permeable core, a high voltage secondary winding around the core with the secondary winding being connectable to a device to be powered, a circuit connectable to a D.C. power source and being magnetically coupled to the secondary winding to induce a voltage thereacross sufficient to power a device, a plurality of connected windings wound around the core, a RC network and a plurality of parallel connected transistors coupled to the windings and the RC network with each respective transistor having a base terminal connected to the RC network by a respective current-variable resistive element, and a first primary winding connected in series with a plurality of second primary windings, and each primary winding connected in parallel with a respective capacitor.

DESCRIPTION OF THE PREFERRED EMBODIMENT

Figure 1:
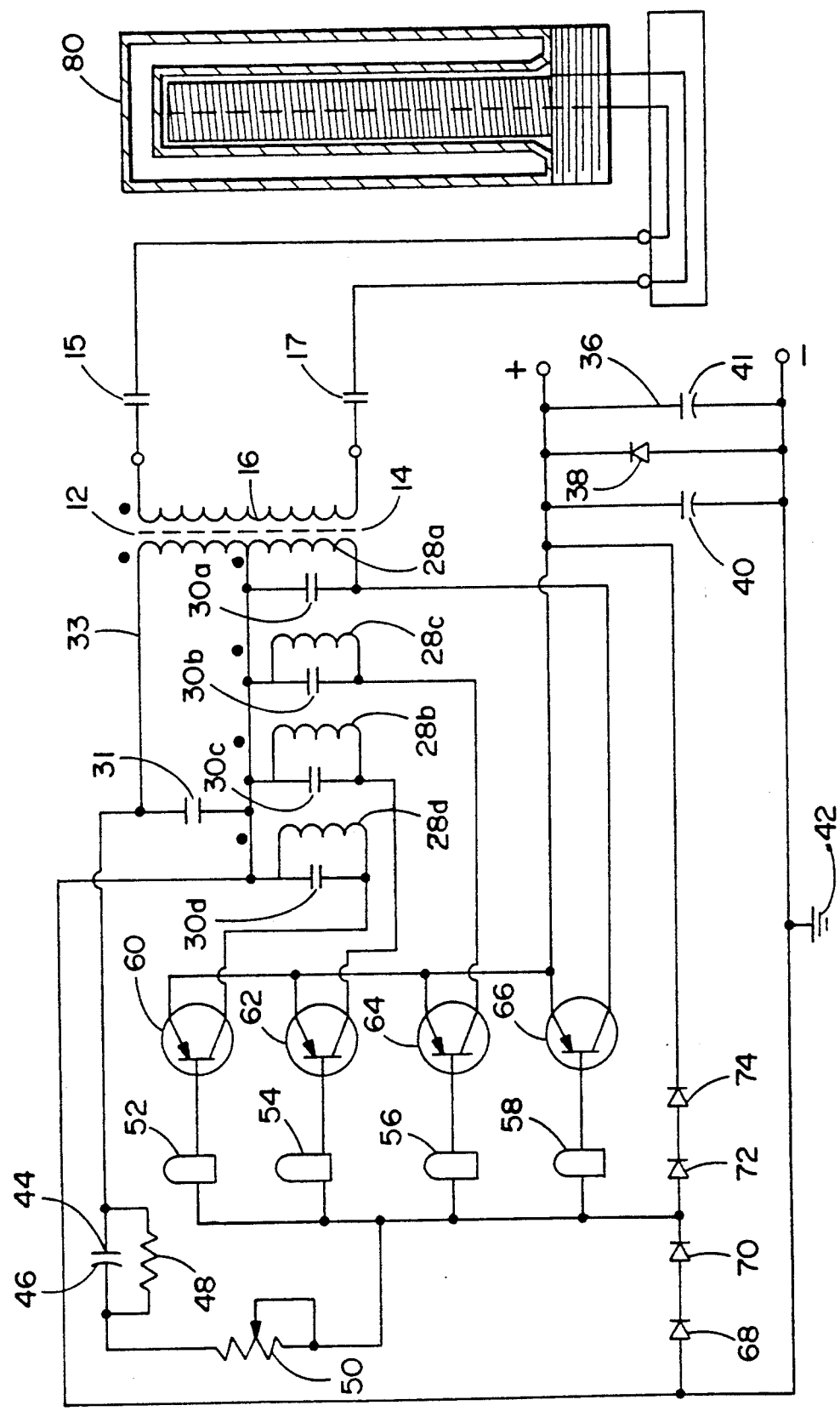
FIG. 1 is an electrical schematic of an improved driver circuit in accordance with the present invention.

Referring now to FIG. 1, the driving circuit shown generally by character numeral 10 and constructed in accordance with the present invention includes a transformer 12 wound on a core 14 of lightweight high permeability material. Core 14 may suitably comprise a type such as part number PR-12 available from Permacore of Oak Lawn, Ill. which is cylindrical in shape and approximately one half inch in diameter and two inches in length. Core 14 carries a high voltage secondary winding 16 of five thousand turns of #34AWG wire the ends of which are connected through capacitors 15 and 17 to the terminals leading to a device to be driven such as inductive capacitance florescent lamp device 80.

Core 14 also carries a first primary winding 26 of fifteen turns of #24 AWG wire and a plurality of second primary windings 28a, 28b, 28c and 28d each having the number of turns equal to the applied D.C. voltage in volts. Preferably the second primary windings 28a-28d are wound most closely adjacent the surface core 14. Winding 26 is then wound atop of windings 28a-28d while secondary winding 16 is wound atop of both windings 28 and 28a-28d. An insulating layer should be provided between each layer of windings.

A primary advantage of having a plurality of second primary windings about the same core as the first primary winding is to reduce energy loss. In U.S. Pat. No. 5,072,159, for example, the air coils connected to the emitters of the various transistors limit the magnitude of the peak voltage to values low enough to avoid damage to the transistors. Such coils, however, can become discernibly hot to the touch during operation, a prime indication of energy loss in a circuit due to the generation of heat. To overcome the energy loss, it is necessary to increase the energy input. By placing such coils about core 14 in the manner described herein, not only is the original function obtained, the coils additionally can act in the same manner as the second primary winding in the Patent while reducing the number of coil components in the circuit.

Each winding 28a-28d is connected in parallel to a respective associated capacitor 30a-30d. For illustrative purposes only, second primary windings 28a-28d are shown progressively further from core 14 in order that the parallel aspect be illustrated. As should be understood from the description above the windings are actually wound about core 14. The first primary winding 26 and parallel networks of second primary windings 28a-28d and associated capacitors 30a-30d are commonly connected to a node 32 and, via line 34, to the negative terminal of power supply 36. Power supply 36 is preferably shunted by a protective network of diode 38 and capacitors 40 and 41. Line 34 is grounded as shown at ground 42. The end of winding 26 opposite node 32 is connected to RC network comprised of capacitor 46 and resistor 48.

Capacitors 30a-30d and 31 serve two major purposes. First the capacitors largely eliminate the overshoot usually experienced in the wave form as a peak preceding the normal flat wave form when capacitor 46 discharges. Another prime purpose, however, is to provide a sinusoidal wave form as opposed to the typical rippled square wave. Such a wave form is more desirable as it promotes accurate and easily positioned switching points.

The other end of network 44 is connected in series through potentiometer 50 and to a plurality of current-variable resistive elements 52, 54, 56 and 58, each connected in parallel. Each element 52-58 is respectively connected to the base of a respective PNP transistor 60, 62, 64 and 66. Elements 52-58 serve as base current limiters and help improve the load-sharing among transistors 60-66. Preferably elements 52-58 comprise a five volt 0.115 milliamp rated incandescent bulb.

The transistors preferably comprise a fast switching type such as type D45VH10 available from Motorola.

Such transistors have a rated typical fall time on the order of one hundred nanoseconds, a Vceo of about 80 V-dc and a total power description of 50 watts and have been determined to provide excellent results driving various devices such as neon and florescent tubes. The collectors of the transistors 60-66 are respectively connected to the networks of windings 28a-28d and associated capacitors 30a-30d. The emitters are commonly connected to the positive terminal of power supply 36. A plurality of diodes 68, 70, 72 and 74 are positioned so as to provide a path through which capacitor 46 can discharge, to protect transistors 60-66 from zener breakdown, and to prevent spiking from the base of the transistors.

The operation of the improved circuit is similar to that found in U.S. Pat. No. 5,072,159 in that the capacitor of the RC network in the Patent is charged directly when the power supply is initially connected into the circuit. When the capacitor discharges, a voltage pulse is created across the transformer to energize the neon tube. While the circuit of the Patent is also similar in certain other respects, there are major distinctions with respect to the present invention. Not only are first and second primary windings placed in parallel with respective capacitors of a predetermined and preferably matched capacitance and wound about the same core to provide a better wave form and increased energy efficiency, but the collectors are connected in series with the respective windings 28a-28d.

TABLE 1

| ELEMENT | DESCRIPTION |
| --- | --- |
| Capacitors 30a-30d | .88 microfarad |
| Diode 38 | 1000 P.I.V./2.5 ampere |
| Capacitor 40 | 1 microfarad/v |
| Capacitor 41 | 6300 microfarad/v |
| Elements 52-58 | 0.115 milliampere/5 volt incandescent lamp |
| Transistors 60-66 | Motorola D45VH10/equivalent |
| Capacitor 46 | 1 microfarad electrolytic nonpolar |
| Resistor 48 | 200 ohms |
| Potentiometer 50 | 1000 ohms |
| Core 14 | Permacore PR-12 |
| Secondary Winding 16 | 5000 turns |
| First Primary Winding 26 | 15 turns |
| Second Primary Windings | Voltage dependent No. turns = |

TABLE 1-continued

| ELEMENT | DESCRIPTION |
| --- | --- |
| 28a-28d | voltage (# volts) |
| D.C. Power Supply | 6-18 V. D.C. |
| Capacitor 31 | .22 microfarads |
| Diodes 68-74 | 1000 P.I.V./2.5 Amp. |

The Table 1 above sets forth a parts listing for the preferred embodiment illustrated in FIG. 1.

It is to be understood that the improved driver circuit of the present invention is not limited to the sole embodiment described above, but encompasses any and all embodiments within the scope of the following claims.

I claim:

1. An improved driving circuit including a magnetically permeable core, a high voltage secondary winding around said core, said secondary winding being connectable to a device to be powered, a circuit connectable to a D.C. power source and being magnetically coupled to said secondary winding to induce a voltage thereacross sufficient to power a device, a plurality of connected primary windings wound around said core, a RC network and a plurality of parallel connected transistors coupled to said primary windings and said RC network with each respective transistor having a base terminal connected to said RC network by a respective current-variable resistive element, said improved circuit further including said primary windings having a first primary winding connected in series with a plurality of second primary windings and each of said first and second windings connected in parallel with a respective capacitor.

2. The improved circuit of claim 1 in which the collectors of said transistors are connected to a respective one of said plurality of second primary windings.

3. The improved circuit of claim 1 including at least one diode connected between said plurality of second primary windings and respective capacitors and emitters of said respective transistors.

4. The improved circuit of claim 1 in which said first primary winding and each of said second primary windings and respective capacitors are connected to a common node with said RC network.

5. The improved circuit of claim 1 in which said RC network is connected to a node common to each current-variable resistive element.

* * * * *